July 9, 1957
A. C. SLADKY ET AL
2,798,247
UTENSIL HANDLE STRUCTURE
Filed Oct. 18, 1954
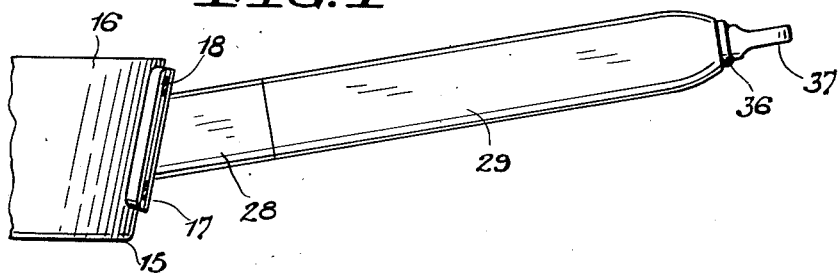
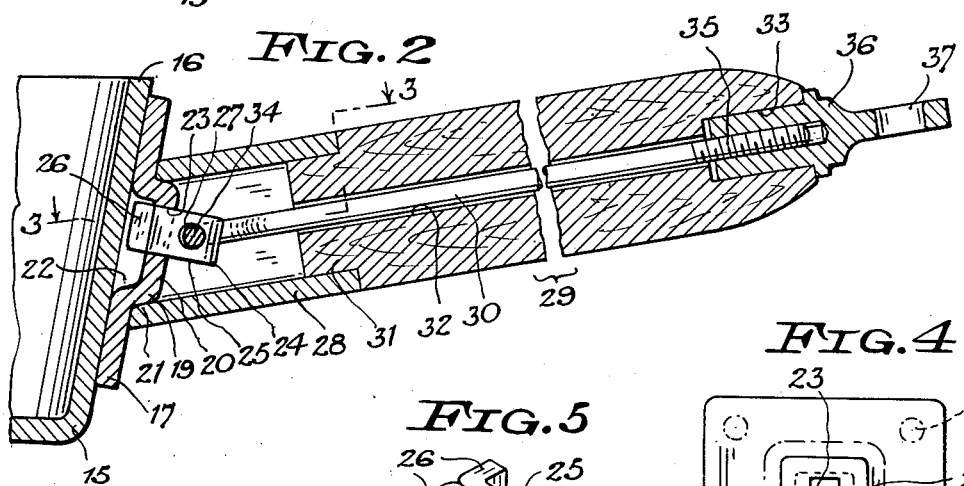
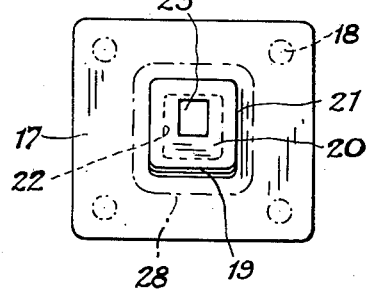
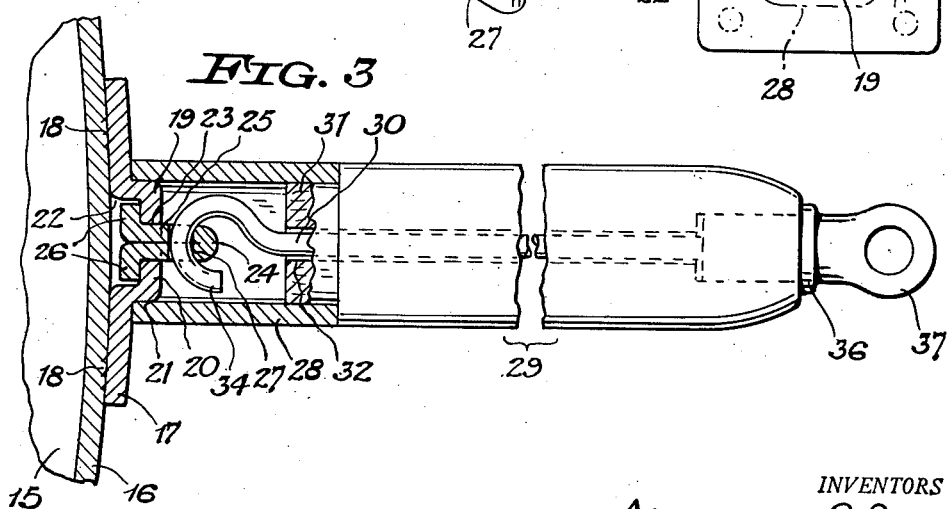
INVENTORS
ALEXANDER C. SLADKY
AND RUDOLPH F. GEHM
BY Christopher L. Naal
ATTORNEY United States Patent Office 2,798,247
Patented July 9, 1957

2,798,247
UTENSIL HANDLE STRUCTURE

Alexander C. Sladky, Ellison Bay, and Rudolph F. Gehm, Kewaunee, Wis., assignors to Leyse Aluminum Company, Kewaunee, Wis., a corporation of Wisconsin Application October 18, 1954, Serial No. 462,671

1 Claim. (Cl. 16—110)

The present invention relates to handles for cooking utensils and the like.

An object of the invention is to provide an improved utensil handle which is of strong, rugged, and inexpensive construction, and which can be easily assembled.

Another object is to provide a utensil handle including novel retaining means for attaching a handle-clamping rod to the utensil.

The invention further consists in the several features hereinafter described and claimed.

In the accompanying drawing,

Fig. 1 is a side elevational view of a handle of the invention attached to a utensil;

Fig. 2 is a longitudinal vertical sectional view of the attached handle;

Fig. 3 is a top view of the attached handle, parts being shown in section along the line 3—3 of Fig. 2;

Fig. 4 is a detail elevational view of a mounting plate for the handle, and

Fig. 5 is a perspective view of an anchor member.

In the drawing, 15 designates a metallic container or vessel having a side wall 16. By way of example, the container may be a frying pan or sauce pan formed of sheet aluminum alloy.

A mounting plate 17, such as of sheet aluminum alloy, is suitably secured to the outer face of the utensil side wall 16, as by spot welding 18, or by riveting, the plate being curved or bent to conform to the outer surface of the utensil side wall. An embossment 19 is formed on the middle portion of the mounting plate and presents a flat wall portion 20 and a peripheral shoulder 21 which is here shown to be of rectangular shape. However, oval and other non-circular shapes may be provided. The formation of the embossment 19 leaves a shallow inner recess or cavity 22 in the mounting plate. An opening 23 of rectangular shape is formed in the embossment wall 20, as by punching.

The opening 23 receives therethrough a T-shaped anchor member 24 which is inserted in place before the mounting plate is secured to the utensil. The anchor member comprises a flat metal bar or strip, such as of steel, reversely bent or doubled on itself to form a shank portion 25 of rectangular cross-section, the ends of the strip being bent away from each other to form aligned end lugs or lips 26 constituting a head portion which is disposed in the mounting plate recess 22. A transverse bore or opening 27 extends through both plies of the shank portion. The head-forming lugs 26 of the anchor member bear against the flat inner face of the embossment wall 20, these lugs being loosely confined between this wall and the adjacent side wall of the utensil. The shank portion 25 of the anchor member slidably fits in the embossment wall opening 23 against relative rotation, and may have either a loose fit or a frictional fit in this opening.

A spacer sleeve or ferrule 28 and a handle member or hand grip 29 aligned therewith are secured to the mounting plate 17 by a clamping rod or bolt 30, as hereinafter described, the sleeve being interposed between the hand grip and the mounting plate.

The sleeve 28, which is of rectangular or other non-circular cross-section, is positioned and held against rotation by the mounting plate embossment 19, the inner end of the sleeve fitting over the peripheral shoulder 21 of the embossment and abutting and fitting against the outer face of the mounting plate around the embossment. The inner end of the sleeve is here shown to be cut or formed on a bias to place the handle at a suitable inclination. The sleeve is made of any suitable metal such as aluminum or stainless steel.

The handle member or hand grip 29, which is preferably made of bakelite, wood, or other suitable non-metallic material, has a reduced shouldered inner end 31 of non-circular shape fitting in the adjacent end of the sleeve 28 against relative rotation and abutting against the end edge face of the sleeve. The hand grip has formed longitudinally therethrough a bore 32 which receives therein the clamping rod 30, the bore having a counterbore 33 at its outer end.

The clamping rod 30, which is preferably made of steel, is formed at its inner end with a hooked or apertured portion 34 which is engaged in the transverse opening 27 of the anchor member shank 25, the hooked engagement preventing relative rotation of the rod with respect to the anchor member and mounting plate. The outer end of the rod 30 has a screw-threaded portion 35 which is engaged by a flanged nut 36 of conventional type for detachably clamping the handle and sleeve in place, the nut being made of a suitable metal such as aluminum or stainless steel. The nut fits in the counterbore 33 of the hand grip and is provided at its outer end with an eye 37 for turning the nut and for hanging the utensil.

In assembling the utensil, the headed anchor member 24 is inserted in the apertured embossment of the mounting plate 17, and the plate is then secured to the container side wall 16, as by the spot welding 18, thus confining the anchor member in the mounting plate recess 22. As the anchor member is relatively short, it does not interfere with the plate-attaching operation. The hooked end 34 of the clamping rod 30 is then engaged in the transverse opening 27 of the anchor member shank, and the spacer sleeve 28 is passed over the rod and positioned over the mounting plate embossment 19. The hand grip 29 is then slid over the rod into interengagement with the sleeve, and the nut 36 is engaged on the threaded outer end portion of the rod, thus securing the hand grip and sleeve firmly in place against rotation.

The handle structure of the invention is of strong and rugged construction and is capable of inexpensive manufacture and easy assembly. If the non-metallic hand grip should become damaged or broken, it can readily be replaced.

We claim:

In a mounting for attaching a handle to a utensil, a mounting member adapted to be secured to a utensil and having an embossment with a rectangular opening therethrough and a recess behind the embossment, an anchor member formed of a flat bar folded along a line midway of its ends to form a shank portion, the adjacent ends being bent over at right angles, the shank portion of said anchor member extending through the rectangular opening and interengaging therewith, the bent-over ends engaging the inner side of the embossment to prevent outward movement of the anchor, the shank portion having a transverse opening outwardly of the embossment, said transverse opening being adapted to receive a bent-over end of a handle retaining rod.

References Cited in the file of this patent
UNITED STATES PATENTS

| | | |
|---|---|---|
| 1,037,118 | Brewer | Aug. 27, 1912 |
| 2,624,066 | Fry | Jan. 6, 1953 |